US011538674B2

(12) United States Patent
Vrijsen et al.

(10) Patent No.: US 11,538,674 B2
(45) **Date of Patent: *Dec. 27, 2022**

(54) SYSTEM AND METHOD FOR LOADING AN ION TRAP

(71) Applicant: Duke University, Durham, NC (US)

(72) Inventors: Geert Vrijsen, Durham, NC (US); Jungsang Kim, Chapel Hill, NC (US); Robert Spivey, Durham, NC (US); Ismail Inlek, Durham, NC (US); Yuhi Aikyo, Durham, NC (US)

(73) Assignee: Duke University, Durham, NC (US)

(*) Notice: Subject to any disclaimer, the term of this patent is extended or adjusted under 35 U.S.C. 154(b) by 2 days.

This patent is subject to a terminal disclaimer.

(21) Appl. No.: 16/950,703

(22) Filed: Nov. 17, 2020

(65) Prior Publication Data

US 2021/0217598 A1 Jul. 15, 2021

Related U.S. Application Data

(63) Continuation of application No. 16/357,488, filed on Mar. 19, 2019, now Pat. No. 10,923,335.

(Continued)

(51) Int. Cl.

| | |
|---|---|
| ***H01J 49/04*** | (2006.01) |
| ***H01J 49/16*** | (2006.01) |
| ***H01J 49/42*** | (2006.01) |
| ***H01J 49/00*** | (2006.01) |
| ***G06N 10/00*** | (2022.01) |

(52) U.S. Cl.

CPC .......... *H01J 49/0018* (2013.01); *G06N 10/00* (2019.01); *H01J 49/0463* (2013.01); *H01J 49/161* (2013.01); *H01J 49/422* (2013.01)

(58) Field of Classification Search

CPC .................................................. H01J 49/0463

See application file for complete search history.

(56) References Cited

U.S. PATENT DOCUMENTS

| | | | |
|---|---|---|---|
| 2009/0321719 A1 | 12/2009 | Folman et al. |
| 2017/0105276 A1 | 4/2017 | Kock et al. |
| 2019/0027355 A1 | 1/2019 | Kim et al. |

OTHER PUBLICATIONS

Notice of Allowance and Fees Due (PTOL-85) dated Jan. 4, 2021 for U.S. Appl. No. 16/357,488.

(Continued)

*Primary Examiner* — Eliza W Osenbaugh-Stewart

(74) *Attorney, Agent, or Firm* — Kaplan Breyer Schwarz, LLP

(57) ABSTRACT

Systems and methods for loading microfabricated ion traps are disclosed. Photo-ablation via an ablation pulse is used to generate a flow of atoms from a source material, where the flow is predominantly populated with neutral atoms. As the neutral atoms flow toward the ion trap, two-photon photo-ionization is used to selectively ionize a specific isotope contained in the atom flow. The velocity of the liberated atoms, atom-generation rate, and/or heat load of the source material is controlled by controlling the fluence of the ablation pulse to provide high ion-trapping probability while simultaneously mitigating generation of heat in the ion-trapping system that can preclude cryogenic operation. In some embodiments, the source material is held within an ablation oven comprising an electrically conductive housing that is configured to restrict the flow of agglomerated neutral atoms generated during photo-ablation toward the ion trap.

20 Claims, 12 Drawing Sheets

Related U.S. Application Data

(60) Provisional application No. 62/644,771, filed on Mar. 19, 2018.

(56) References Cited

OTHER PUBLICATIONS

Andre Van Rynbach et al., "An Integrated Mirror and Surface Ion Trap with a Tunable Trap Location", Aug. 27, 2018, 5 pp.
Final Rejection dated Sep. 4, 2020 for U.S. Appl. No. 16/357,488.
Geert Vrijsen et al., "Isotope-selective Ablation Loading of Yb Ions in a Surface Electrode Trap", Feb. 13, 2019, 4 pp.
Hendricks et al., An all-optical ion-loading technique for scalable microtrap architectures, 2007, Applied Physics B, vol. 88.
Johanning et al., 'Resonance-enhanced isotope-selective photoionization of Ybl for ion trap loading', 2011, Applied Physics B, vol. 103.
List of references Mailed on May 7, 2020 for U.S. Appl. No. 16/357,488.
Non-Final Rejection dated May 7, 2020 for U.S. Appl. No. 16/357,488.
Notice of Allowance and Fees Due (PTOL-85) dated Nov. 12, 2020 for U.S. Appl. No. 16/357,488.
Ronald P. Manginell et al., "In situ dissolution or deposition of Ytterbium (Yb) metal in microhotplate wells for a miniaturized atomic clock", "Optics Express", Oct. 22, 2012, Publisher: Optical Society of America, pp. 24650-24663, vol. 20, No. 22.
Sheridan et al., 'All-optical ion generation for ion trap loading', 2011, Applied Physics B, vol. 104.

700

804

806

900

SYSTEM AND METHOD FOR LOADING AN ION TRAP

CROSS REFERENCE TO RELATED APPLICATIONS

This case is a continuation of co-pending U.S. patent application Ser. No. 16/357,488, filed Mar. 19, 2019, which claims priority of U.S. Provisional Patent Application 62/644,771 entitled "A thermal and Isotope-Selective Methods for Trapping Ablation-Laser Generated Atoms and Methods of Making and Using Same," filed Mar. 19, 2018, each of which is incorporated herein by reference in its entirety. If there are any contradictions or inconsistencies in language between this application and one or more of the cases that have been incorporated by reference that might affect the interpretation of the claims in this case, the claims in this case should be interpreted to be consistent with the language in this case.

STATEMENT REGARDING FEDERALLY SPONSORED RESEARCH

This invention was made with Government support under Federal Grant No. W911NF-16-1-0082 awarded by the Intelligence Advanced Research Projects Activity (IARPA). The Federal Government has certain rights to this invention.

TECHNICAL FIELD

The present disclosure relates to quantum computing systems in general, and, more particularly, to systems and methods for loading an ion trap.

BACKGROUND

Quantum computing is an emerging technology that leverages a quantum mechanical phenomenon not available in classical systems (e.g., superposition and entanglement, etc.) to process information. In a conventional computing system, the basic unit of information is a bit, which is a two-state element that can be in either a "one" or a "zero" state. In contrast, the basic unit of information in a quantum-computing system, referred to as a qubit, can be in any superposition of both states at the same time (referred to as "superposition states"). Furthermore, many qubits can be in a superposition of correlated states in a way that the system cannot be described as a product of the individual qubit states (referred to as "entangled states"). These forms of qubit states representing the information are not available in conventional (classical) computers. As a result, theoretically, a large-scale quantum computer can solve some problems that simply are not feasible using conventional computing approaches. Unfortunately, quantum computers have proven difficult to realize in large scale due to the size and complexity of their components.

One attractive avenue for realizing quantum computing is "trapped-ion processing," in which atomic ions of a source material are provided to a quadrupole ion trap (a.k.a. an RF Paul Trap), which holds them in a free-space position. The position of the trap location is determined by the RF field null in the electric field generated by the RF signals applied to a plurality of RF driver electrodes that define the ion trap. Once trapped, the ions are addressed and read-out optically using one or more optical signals.

Many research-grade quantum-computing systems are based macro-scale ion traps that include wires or rods that are carefully arranged in precise alignment with one another. While suitable for use in laboratory settings, such macro-scale ion traps are too large, bulky, and/or complex for practical use in commercially viable systems. In recent years, however, the development of small microfabricated surface traps has enabled quantum computing systems that have the potential for large-scale implementation. A microfabricated surface trap includes an electrode arrangement formed on the surface of a planar substrate using the same fabrication tools used to form integrated circuits.

The small scale of these surface traps and the narrow separations between their electrodes gives rise to several challenges to their use with the conventional sub-systems used to provide atomic ions to be trapped, however. The generation of atomic ions normally occurs in a two-step process, in which atoms are first liberated from a source material via sublimation or ablation. The liberated atoms are then ionized as they travel toward the ion trap.

Unfortunately, conventional processes used to liberate atoms from a source material typically provide an uncontrolled supply of atoms that include a plurality of source-material isotopes, neutral atoms, and atoms that are in a range of ionization states upon their generation. As a result, the subsequent ionization process results in a mixture of ions of different isotopes and ionization states being provided to the ion trap. In addition, the sublimation/ablation process can generate significant heat that is coupled into the ion-trapping system.

For example, thermal ablation via a Joule-heated thermal source has been widely used to generate a sublimated stream of atoms from a source material in the prior art. Unfortunately, the heat load associated with thermal ablation precludes its use with ion-trapping systems intended for operation at cryogenic temperatures. Still further, the thermal time constant (on the order of a minute) associated with heating the thermal source limits the rate at which an ion-loading process can be performed.

Alternatively, diffusion ovens combined with magneto-optical trapping (MOT) systems have been used to provide a neutral-atom cloud. Unfortunately, such approaches require additional lasers, optics and other mechanical structures to establish the MOT, are extremely bulky and, as a result, are not typically compatible with small-scale surface ion traps.

Another alternative approach to atom generation employs laser-ablation of source material. While this approach has demonstrated successful loading of ions into macro-scale ion traps, successful loading of a microfabricated surface ion trap has yet to be shown.

Furthermore, a drawback of nearly all prior-art ion-loading methods with respect to their use with practical microfabricated surface ion traps is that they tend to generate significant residue, such as agglomerated atoms or other contamination. This residue can deposit onto the surface ion trap and short out the closely spaced electrodes, thereby rendering the ion trap unusable or severely compromised.

The need for systems and methods for trapping ions in a microfabricated surface ion trap with isotope selectivity, little or no residue deposition, and at high speed remains, as yet, unmet in the prior art.

SUMMARY

The present disclosure enables systems and methods for loading microfabricated ion traps without some of the costs and disadvantages of the prior art. Embodiments in accordance with the present disclosure employ controlled photo-ablation to liberate predominantly neutral atoms from a source material and mitigate the deposition of agglomerated source atoms on the ion trap. Furthermore, in some embodiments, the photo-ablation process is controlled to realize a large population of liberated atoms having a velocity that enables them to be trapped in the ion trap. Embodiments in accordance with the present disclosure are particularly well suited for use in numerous applications, such as atomic clocks, precision spectroscopy, mass spectroscopy, quantum computing, quantum sensing, and the like.

Like prior-art ion-trapping systems, embodiments in accordance with the present disclosure employ photo-ablation to liberate atoms from a source material that is characterized by a plurality of isotopes, as well as two-photon-absorption-based photo-ionization to ionize the liberated atoms.

In sharp contrast to the prior-art, embodiments in accordance with the present disclosure control the fluence of the ablation pulses to avoid initiating a plasma discharge at the source material. This affords embodiments in accordance with the present disclosure significant advantages by preferentially liberating neutral atoms rather than an uncontrolled mixture of neutral and ionized atoms as in prior-art systems. As a result, photo-ionization can be employed in a manner that selectively ionizes only a specific isotope while leaving other isotopes in their neutral state. In other words, embodiments in accordance with the present disclosure enable substantially isotope-selective loading of an ion trap.

In addition, avoiding a plasma discharge at the source material mitigates the generation of residue, such as agglomerated source-material atoms or other contaminants. Such residue can then deposit onto the ion trap, thereby degrading or destroying its functionality.

Furthermore, by controlling the fluence of the ablation pulses, the population of atoms having a velocity low enough to be trapped can be increased, thereby increasing the trapping probability per ablation pulse.

An illustrative embodiment is an ion-trap system that includes a microfabricated ion trap, a photo-ablation system, and a photo-ionization system, where the microfabricated ion trap includes a plurality of electrodes arranged on the surface of a substrate to define a trapping region.

The photo-ablation system includes an ablation laser and an ablation oven that contains source material of ytterbium. The ablation laser is configured to provide an ablation pulse having a fluence that is controlled such that it has enough energy to ablate at least one ytterbium atom but not enough energy to enable a plasma discharge at the source material. As a result, little or no residue is generated and the atoms that are liberated from the source material are predominantly neutral. Furthermore, the ablation oven includes a chamber that is configured to inhibit the exit of agglomerated atoms or other contamination from the ablation oven. Still further, the fluence of the ablation pulse is controlled to generate a large population of liberated atoms having a desired velocity, where the desired velocity is selected to increase the probability that an ionized atom will be trapped by the ion trap.

The photo-ionization system is a two-photon photo-ionization system in which a first light signal provided by a first photo-ionization laser and a second light signal provided by a second photo-ionization laser are combined into a composite photo-ionization beam via a dichroic beam splitter. The frequency of the first light signal is controlled such that it matches the resonant dipole transition of a desired isotope of ytterbium. In the illustrative embodiment, the desired isotope is $^{174}$Yb.

As an ablated neutral atom travels from the ablation oven to the trapping region, it interacts with the composite beam and absorbs a photon from the first light signal giving rise to the resonant dipole transition in the neutral atom that excites it into an excited state that is less than the continuum. Absorption of an additional photon from the second light signal drives the neutral atom from this excited state into the continuum, thereby ionizing it.

In some embodiments, the first photo-ionization laser is controlled such that it has a frequency equal to the resonant dipole transition of a different isotope of ytterbium. In some embodiments, the source material is a material other than ytterbium.

An embodiment in accordance with the present disclosure is an ion-trap system comprising: an ion trap, wherein the ion trap is a microfabricated surface-electrode ion trap having a trapping region; a photo-ablation system comprising: (i) an ablation oven for holding a source material, wherein the ablation oven is characterized by a first fluence at which photo-ablation of a first neutral atom from the source material is enabled, and wherein the ablation oven is characterized by a second fluence at which plasma generation at the source material is enabled; and (ii) an ablation laser that is configured to provide an ablation pulse having a fluence that is equal to or greater than the first fluence and less than the second fluence; wherein the ablation laser and ablation oven are optically coupled; and a photo-ionization (PI) system configured to photo-ionize the first neutral atom.

Another embodiment in accordance with the present disclosure is an ion-trap system comprising: an ion trap, wherein the ion trap is a microfabricated surface-electrode ion trap comprising a substrate and a plurality of electrodes disposed on the substrate, wherein the plurality of electrodes defines a trapping region; a photo-ablation system comprising: (i) an ablation oven for holding a source material; (ii) the source material, wherein the source material is characterized by a plurality of isotopes that includes a first isotope having a first characteristic resonant frequency; and (iii) an ablation laser that is configured to provide an ablation pulse to the source material, wherein the ablation pulse has fluence sufficient to ablate a plurality of neutral atoms from the source material without inducing a plasma discharge; a first photo-ionization (PI) laser configured to enable excitation of a first neutral atom of the plurality thereof to a first excited state, the first PI laser having a frequency that is equal to the first characteristic frequency; and a second PI laser configured to enable excitation of the first neutral atom from the first excited state to the continuum.

Yet another embodiment in accordance with the present disclosure is a method for trapping an ion in a microfabricated ion trap, the method comprising: photo-ablating a first neutral atom from a source material that is characterized by a plurality of isotopes that includes a first isotope having a first characteristic resonant frequency; exciting the first neutral atom to a first excited state that is less than the continuum by exposing the first neutral atom to a first photo-ionization (PI) laser signal that has a frequency equal to the first characteristic resonant frequency; ionizing the first neutral atom to create a first ion by exciting the first neutral atom from the first excited state to the continuum by exposing the first neutral atom to a second PI laser signal; and trapping the first ion in an ion trap that is a microfabricated surface-electrode ion trap comprising a substrate and a plurality of electrodes disposed on the substrate, wherein the plurality of electrodes defines a trapping region.

DETAILED DESCRIPTION

Figure 1:
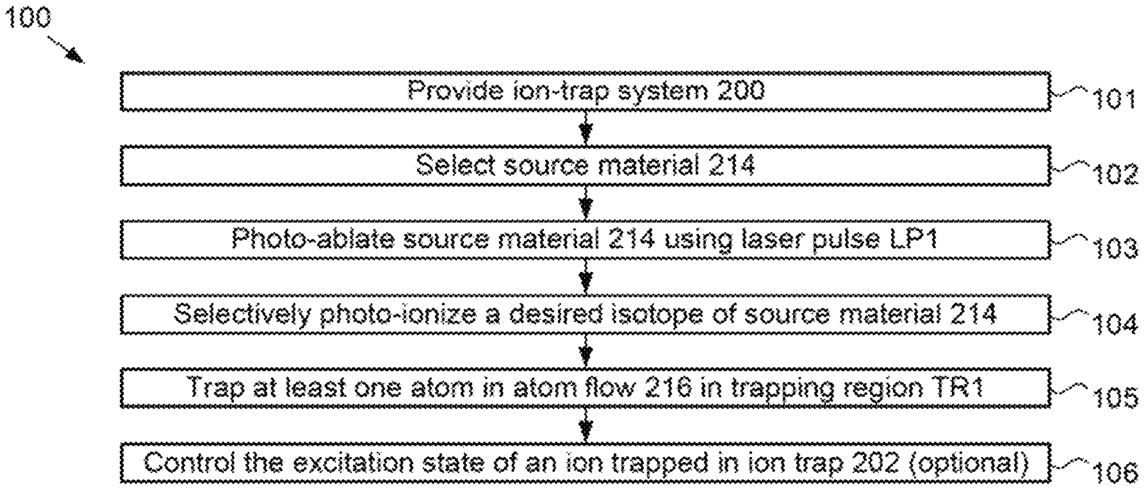
FIG. 1 depicts operations of an illustrative embodiment of a method for loading one or more ions into an ion trap in accordance with the present disclosure.

FIG. 1 depicts operations of an illustrative embodiment of a method for loading one or more ions into an ion trap in accordance with the present disclosure. Method 100 begins with operation 101, wherein ion-trap system 200 is provided.

Figure 2:
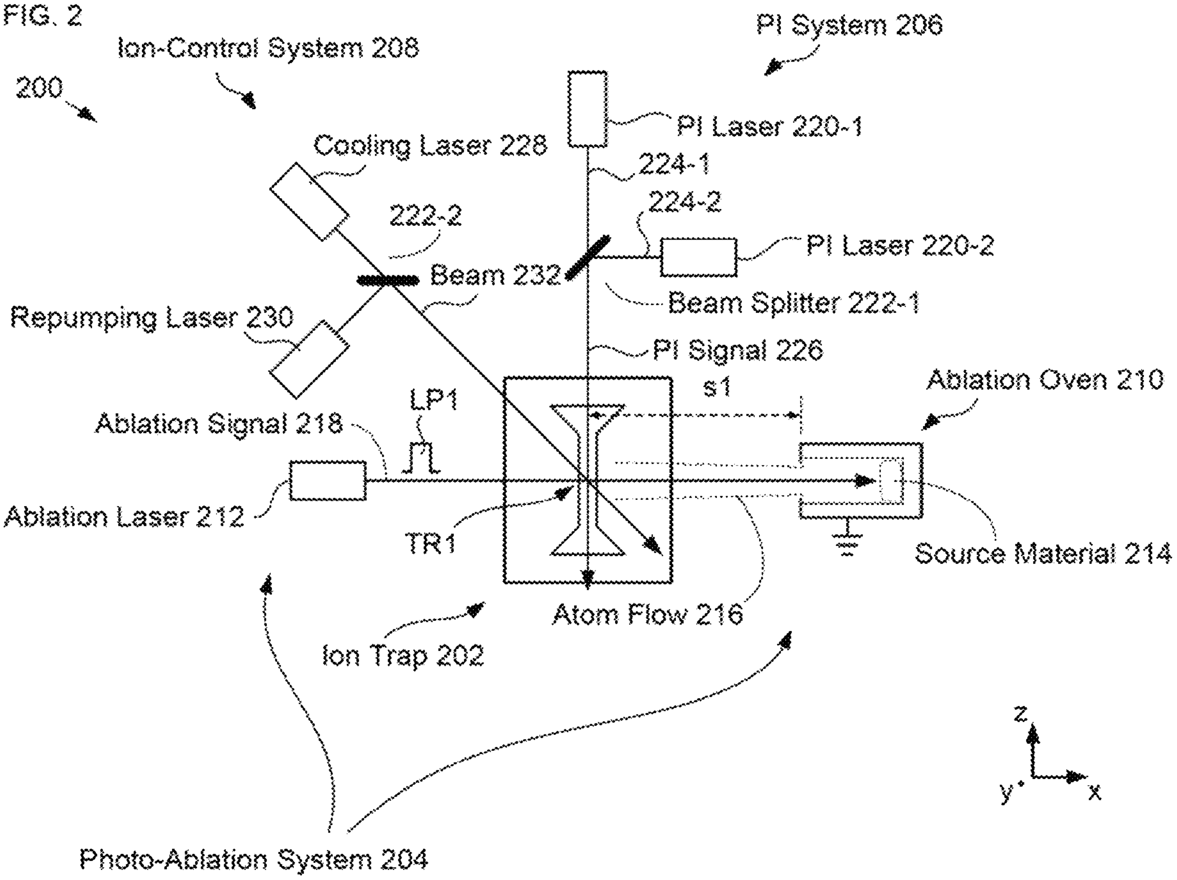
FIG. 2 depicts a schematic drawing of an illustrative embodiment of an ion-trap system in accordance with the illustrative embodiment.

FIG. 2 depicts a schematic drawing of an illustrative embodiment of an ion-trap system in accordance with the illustrative embodiment. System 200 includes ion trap 202, photo-ablation system 204, photo-ionization system 206, and optional ion-control system 208.

Ion trap 202 is a microfabricated surface ion trap having a plurality of electrodes that are controllable to define trapping region TR1. For the purposes of this Specification, including the appended claims, a "microfabricated surface ion trap" is defined as an ion trap comprising a plurality of electrodes disposed on the surface of a substrate, where the electrodes are formed using planar-processing fabrication technology, such as those used to fabricate integrated-circuits. In embodiments in accordance with the present disclosure, adjacent electrodes of a microfabricated surface ion trap are separated by a distance of less than or equal to 100 microns. In some embodiments, the separation between adjacent electrodes is less than or equal to 10 microns. As a result, it is critical that deposition of residue from atom ablation, or other contaminants, on a microfabricated surface ion trap used herein is mitigated to ensure proper ion-trap functionality.

In the depicted example, ion trap 202 is a surface Paul trap having an electrode configuration disposed on a substrate, where the electrode configuration enables lateral and vertical control of the position of trapping region TR1 without inducing significant micromotion. It should be noted, however, that the teachings of the present disclosure are applicable to any conventional microfabricated surface trap. As a result, in some embodiments, a different microfabricated surface trap is used in system 200. Examples of surface traps suitable for use in embodiments described herein include, without limitation, quadrupole RF surface electrode traps (e.g., Sandia National Laboratories HOA-2.012, etc.), surface traps described by A. Van Rynback, et al., in "An integrated mirror and surface ion trap with tunable trap location," in *App. Phys. Lett.*, Vol. 109, pg. 221108-1 (2016), and the like.

Figure 3A:
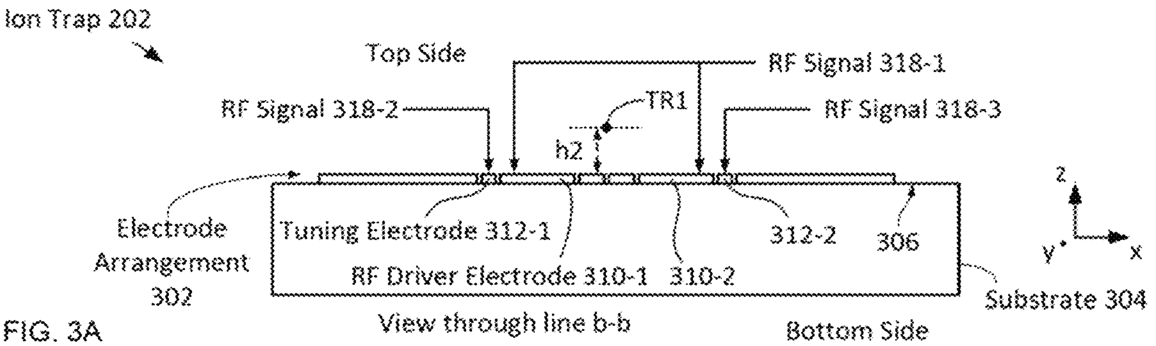
FIGS. 3A-B depict schematic drawings of sectional and top views, respectively, of an ion-trap in accordance with the illustrative embodiment.
Figure 3B:
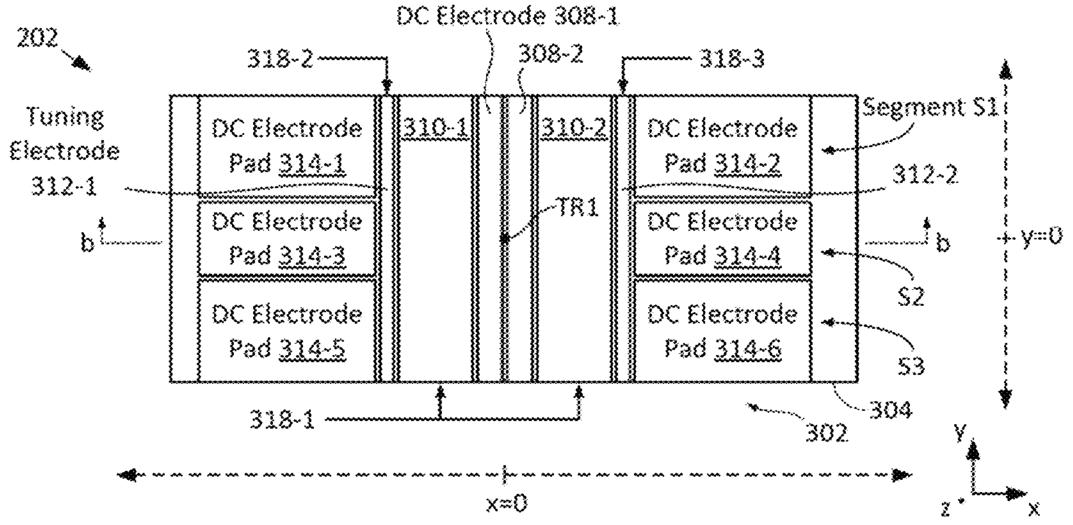

FIGS. 3A-B depict schematic drawings of sectional and top views, respectively, of an ion-trap in accordance with the illustrative embodiment. The sectional view depicted in FIG. 3A is taken through line b-b shown in FIG. 3B.

Surface trap 202 is a linear surface ion-trap that includes electrode arrangement 302 disposed on surface 306 of substrate 304. Surface trap 202 is analogous to surface traps described in detail in U.S. patent application Ser. No. 16/037,988, filed Jul. 17, 2018, the entire content of which is incorporated by reference as if set forth at length herein.

Substrate 304 is a fused-silica substrate suitable for planar processing. Although in the depicted example, substrate 304 comprises fused-silica, any suitable material can be used in substrate 304 without departing from the scope of the present disclosure. It should be noted that surface 306 must be electrically insulating to avoid shorting the electrodes of electrode arrangement 302; therefore, in embodiments in which substrate 304 includes a conducting or semiconducting material, surface 306 is typically coated with an insulating material such as silicon dioxide, silicon nitride, and the like.

Electrode arrangement 302 includes inner DC electrodes 308-1 and 308-2, driver RF electrodes 310-1 and 310-2, tuning electrodes 312-1 and 312-2, and DC electrode pads 314-1 through 314-6. In the depicted example, each of the electrodes of electrode arrangement 302 includes a layer of gold having a thickness of approximately 350 nm disposed on an adhesion layer of titanium having a thickness of approximately 20 nm. It should be noted that any suitable electrically conductive material or materials can be used to form any of the electrodes in electrode arrangement 302.

Inner DC electrodes 308-1 and 308-2 (referred to, collectively, as DC electrodes 308) are formed such that they are lines of electrically conductive material, typically having a width within the range of approximately 10 microns to 500 microns and are separated by a spacing sufficient to mitigate electrical coupling between them—typically within the range of approximate 0.5 microns to approximately 20 microns. In the depicted example, each of inner DC electrodes 308 has a width of approximately 22.5 microns and they are separated by approximately 5 microns. In some embodiments, only a single inner DC electrode is included in surface trap 302. Some embodiments in accordance with the present disclosure include more than two inner DC electrodes. In some embodiments, at least one inner DC electrode includes a plurality of independently addressable electrode sections arranged along the axial direction of an ion trap.

Each of RF driver electrodes 310-1 and 310-2 (referred to, collectively, as driver electrodes 310) is a line of electrically conductive material having a width typically within the range of 20 microns to 500 microns. The RF driver electrodes are formed such that they lie on either side of inner DC electrodes 308 and are separated from the inner DC electrodes by a spacing sufficient to mitigate electrical coupling between them. In the depicted example, each of driver electrodes 310 has a width of approximately 57 microns and are separated from each other by a distance of approximately 60 microns.

Tuning electrodes 312-1 and 312-2 (referred to, collectively, as tuning electrodes 312) are located on either side of RF driver electrodes 310 such that the tuning and RF driver electrodes are operatively coupled and the electric fields generated by driving them are coupled. In the depicted example, each of tuning electrodes 312 has a width of approximately 20 microns; however, tuning electrodes 312 can have any suitable width without departing from the scope of the present disclosure.

In some embodiments, tuning electrodes 312 are located between RF driver electrodes 310.

In some embodiments, at least one of electrodes 308, 310, and 312 includes at least a portion that projects above substrate 304 more or less than other electrodes.

DC electrode pads 314-1 through 314-6 (referred to, collectively, as DC electrode pads 314) are substantially rectangular electrodes that are arranged in pairs on either side of tuning electrodes 312 to define segments S1, S2, and S3, which are arranged along the length of the tuning electrodes. Segment S1 includes DC electrode pads 314-1 and 314-2, segment S2 includes DC electrode pads 314-3 and 314-4, and segment S3 includes DC electrode pads 314-5 and 314-6. It should be noted that the shape and distribution of DC electrode pads 314, relative to the other electrodes of electrode arrangement 302, are matters of design choice. For example, although the depicted example includes three segments, each including a pair of rectangular DC electrode pads located outside of tuning electrodes 310, a different number of segments can be included and/or at least one of DC electrode pads 314 can have a shape other than rectangular and/or be located other than outside a tuning electrode (e.g., between a tuning electrode and its corresponding RF driver electrode, etc.) without departing from the scope of the present disclosure.

In operation, RF signal 318-1 is applied to driver electrodes 310, RF signal 318-2 is applied to tuning electrode 312-1, and RF signal 318-3 is applied to tuning electrode 312-2. The amplitudes and frequencies of RF signals 318-1 through 318-3 are based on the desired location of trapping region TR1, as well as the target ion to be trapped.

In addition, independent DC voltages are provided to DC electrode pads 314-1 through 314-6 to define the shape of the trapping potential of ion trap 202 as desired (e.g., harmonic trap, quartic trap, etc.), as well as control the rotation of the principal axis of the trapping region in the x-z plane. Furthermore, the voltages applied to the DC electrode pads are finely controlled to shift the location of trapping region TR1 along the axial direction (y-axis) of ion trap 202.

It should be noted that the illustrative ion-trapping system is configured such that ablation oven 210 and trapping region TR1 are located on the same side (the top) of substrate 304. As a result, atom flow 216 is provided to trapping region TR1 from the top side of ion trap 202 (i.e., along front surface 306). In some embodiments, however, it is desirable to locate ablation oven 210 and trapping region TR1 in different regions (or compartments) of system 200 to improve thermal and/or contamination isolation between them. For example, in some embodiments, trapping region TR1 and ablation oven 210 are located on opposite sides (i.e., the bottom and top sides) of ion trap 202 such that substrate 304 itself lies between them, thereby at least partially defining different compartments in system 200. In such embodiments, the ion-trap substrate requires an aperture (e.g., a hole, slot, etc.) through its thickness to enable atom flow to pass from the bottom side to the top side of the ion trap and reach trapping region TR1. Examples of such ion trapping systems are described in detail in U.S. Patent Publication 2019/0027355, published Jan. 24, 2019, the entire content of which is incorporated by reference as if set forth at length herein.

At operation 102, source material 214 is selected. Preferably, source material 214 is selected as a material characterized by a plurality of isotopes that can be liberated via photo-ablation. In the depicted example, source material 214 is ytterbium, which is particularly well suited for ion trapping since it has an abundance of natural isotopes.

Figure 4:
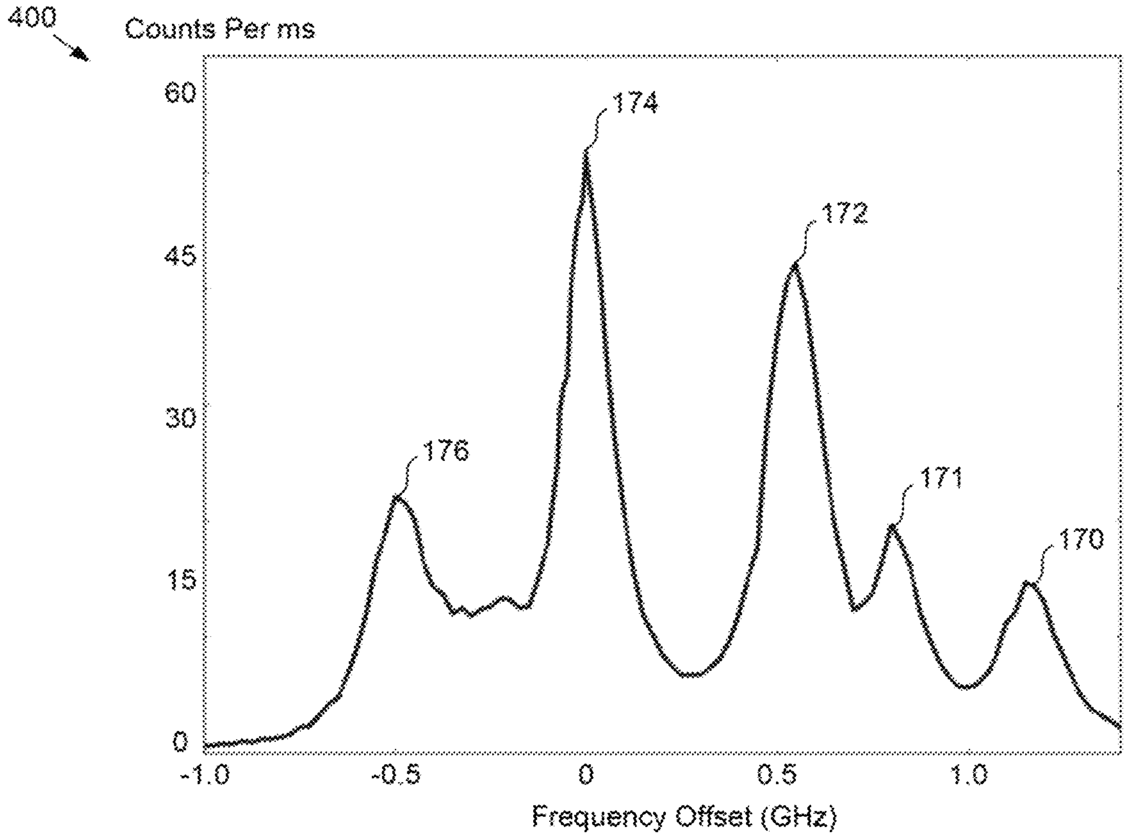
FIG. 4 shows a distribution of natural neutral isotopes of ytterbium measured as a function of frequency offset from the resonant dipole transition of $^{174}$Yb.

FIG. 4 shows a distribution of natural neutral isotopes of ytterbium measured as a function of frequency offset from the resonant dipole transition of $^{174}$Yb. The data shown in plot 400 shows the amount of fluorescence emitted by ablated material as a function of frequency offset from a laser signal having a wavelength of 399 nm, which corresponds to the resonant dipole transition of $^{174}$Yb isotope. As seen from plot 400, strong signatures are obtained for each of the $^{174}$Yb, $^{172}$Yb, $^{176}$Yb, $^{171}$Yb, and $^{170}$Yb isotopes.

Although source material 214 is selected as ytterbium in the depicted example, it will be clear to one skilled in the art, after reading this Specification, how to specify, make, and use alternative embodiments configured to use a source material other than ytterbium. Materials suitable for use in source material 214 include, without limitation, beryllium (Be), magnesium (Mg), calcium (Ca), strontium (Sr), barium (Ba), aluminum (Al), cadmium (Cd), mercury (Hg), etc. Furthermore, such material could be in its pure form, alloys that contain these materials (e.g., BaAl, etc.), or compounds that include these materials (e.g., BaO, SrTiO, BaTiO, AlO, etc.).

At operation 103, photo-ablation system 204 generates atom flow 216 by liberating atoms from source material 214. Photo-ablation system 204 comprises ablation oven 210 and ablation laser 212.

Figure 5:
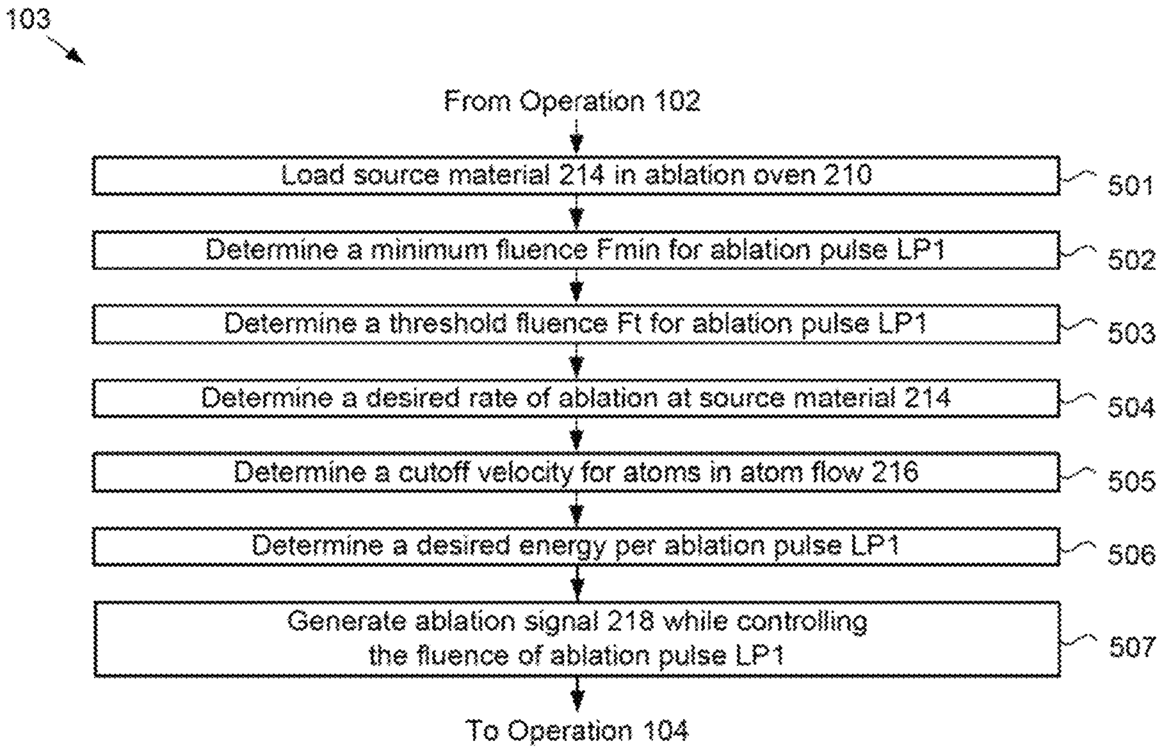
FIG. 5 depicts sub-operations suitable for photo-ablating source material in accordance with the illustrative embodiment.

FIG. 5 depicts sub-operations suitable for photo-ablating source material in accordance with the illustrative embodiment. Operation 103 begins with sub-operation 501, wherein source material 214 is located in ablation oven 210.

Prior-art photo-ablation systems have several disadvantages when used with surface ion traps. First, they tend to generate significant residue, such as multi-atom particles of source material (i.e., agglomerated source-material atoms) or other contaminants, which can deposit on the surface of an ion trap and electrically short closely spaced electrodes or otherwise degrade trap operation. Second, prior-art systems randomly ablate source material such that a mix of neutral atoms and ions is generated, which impairs the ability to selectively load an ion trap with a particular ion.

It is an aspect of the present disclosure, however, that a photo-ablation system can be configured to overcome one or both of these disadvantages. Specifically, in some embodiments, ablation oven 210 is configured to impede the escape of residue generated during photo-ablation of source material 214. In addition, in some embodiments, ablation oven 210 is electrically grounded such that ions generated during the photo-ablation process are attracted to its sidewalls, thereby removing them from atom flow 216. As a result, atom flow 216 substantially includes only neutral atoms. Furthermore, in some embodiments, ablation laser 214 is configured and operated in a manner that mitigates the generation of residue during photo-ablation of source material 214.

Figure 6:
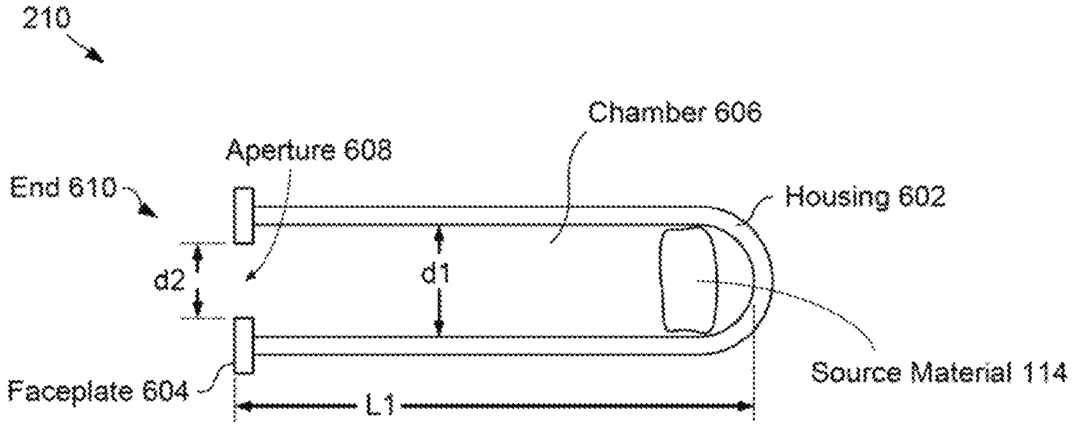
FIG. 6 depicts a cross-sectional view of an ablation oven in accordance with the present disclosure.

FIG. 6 depicts a cross-sectional view of an ablation oven in accordance with the present disclosure. Ablation oven 210 comprises housing 602 and faceplate 604.

Housing 602 is a circular, tubular shell of rigid material that defines chamber 606, which has length L1 and diameter d1. Preferably, source material 214 is located in chamber 606 such that it is distal to trapping region TR1. Housing 602 is terminated by faceplate 604 at end 610, which is proximal to trapping region TR1. In some embodiments, housing 602 has a cross-sectional shape other than circular and diameter d1 refers to a lateral dimension (e.g., width) of chamber 606.

Faceplate 604 is a thin plate of rigid structural material that includes circular aperture 608, which has diameter d2. In some embodiments, aperture 608 has a shape other than circular and diameter d2 refers to a lateral dimension (e.g., width) of the aperture.

The aspect ratio of chamber 606 length and the aperture 608 diameter (i.e., the ratio of L1:d2) and the diameter, d1, of chamber 606 are selected to enable individual ablated atoms to exit ablation oven 210 and progress toward trapping region TR1, while limiting the amount of undesirable material that can escape chamber 606. The aspect ratio L1/d2 determines the transverse velocity distribution of the atomic beam exiting the aperture of the oven.

In the depicted example, L1 is approximately 40 mm, d1 is approximately 1 mm, and d2 is 0.6 mm. It should be noted that a wide range of values can be used for either of L1 and d1; however, preferably, L1 is within the range of approximately 2 mm to approximately 60 mm, d1 is within the range of approximately 0.6 mm to approximately 6 mm, d2 is within the range of approximately 0.1 mm to approximately 4 mm, and the aspect ratio of chamber 606 is within the range of approximately 1 to approximately 60.

Preferably, housing 602 is made of an electrically conductive material and electrically grounded such that any ions generated during a photo-ablation process are attracted to the sidewalls of chamber 606, thereby limiting the number of ions ejected from ablation oven 210. As a result, atom flow 216 contains few, if any, ions (i.e., ideally, atom flow 216 contains only neutral atoms). This enables better control over the ion population that reaches trapping region TR1, since, by starting with only neutral atoms, one particular isotope of the source material can be selectively photo-ionized, as discussed below and with respect to photo-ionization system 206.

In the depicted example, each of housing 602 and faceplate 604 comprises titanium; however, a wide range of materials can be used in either element without departing from the scope of the present disclosure.

Furthermore, ablation oven 210 is typically located such that it is physically separated from trapping region TR1 by spacing s1, where s1 is sufficient to mitigate deposition of any residue (e.g., agglomerated source atoms or other contaminants) that escapes ablation oven 210 during the photo-ablation process. In the depicted example, s1 is approximately 1.1 cm; however, other values can be used for s1 without departing from the scope of the present disclosure.

As noted above, in some embodiments, ablation oven 210 is located on the opposite side of substrate 304 from trapping region TR1. Such a configuration further mitigates deposition of residue on surface 306 and/or electrode configuration 302.

Ablation laser 212 is a laser suitable for liberating one or more atoms from source material 214. In the depicted example, ablation laser 212 is a Q-switched Nd:YAG that has a wavelength of 1064 nm. Ablation laser 212 provides ablation signal 218 as a series of ablation pulses LP1 having a desired repetition rate, pulse width, and fluence, F.

In the depicted example, ablation signal 218 includes a plurality of ablation pulses LP1 generated at a pulse rate of approximately 10 Hz, where each ablation pulse has a pulse width of approximately 6 ns. Ablation signal 218 is focused to a beam waist of approximately 180 microns at aperture 608. It should be noted that any suitable repetition rate, pulse width, and/or beam waist can be used without departing from the scope of the present disclosure.

At sub-operation 502, a minimum fluence, Fmin, for ablation pulse LP1 is determined, where Fmin is the minimum fluence that enables liberation of an atom from source material 214.

At sub-operation 503, a threshold fluence, Ft, for ablation pulse LP1 is determined, where Ft is equal to the minimum fluence that can initiate a plasma discharge source material 214.

It should be noted that the values of Fmin and Ft are dependent upon several factors, including the ambient environment at ablation oven 210, the composition of source material 214, and the like.

At sub-operation 504, a desired rate of ablation at source material 214 is determined. The rate at which individual atoms are liberated from source material 214 is dependent upon the fluence of ablation pulse LP1.

Figure 7:
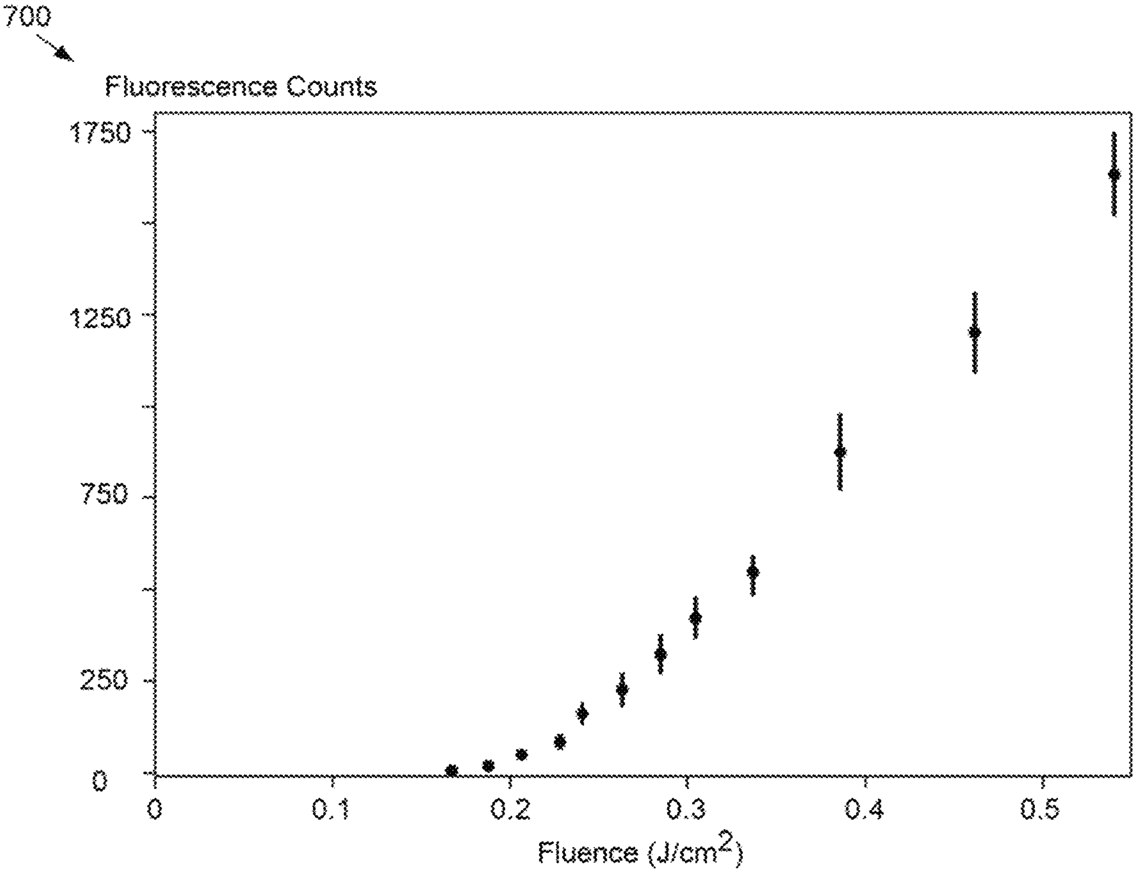
FIG. 7 shows a plot of ablation count versus ablation-pulse fluence. Plot 700 shows measured fluorescence counts for ablated ytterbium using a wavelength of 399 nm.

FIG. 7 shows a plot of ablation count versus ablation-pulse fluence. Plot 700 shows measured fluorescence counts for ablated ytterbium using a wavelength of 399 nm. It is clear from plot 700 that there is a minimum fluence for inducing ablation. In the depicted example, this minimum fluence is approximately 0.2 $J/cm^2$. As fluence is increased above this value, ablation rate increases approximately linearly with fluence.

At operation 505, a cutoff velocity for the atoms in atom flow 216 is determined. The cutoff velocity is the maximum velocity that enables an atom to be trapped in ion trap 202. In other words, an atom travelling with speed less than the cutoff velocity has kinetic energy that is low enough for it to be captured in trapping region TR1. In fact, the trapping potential of an ionized atom increases proportionately with the difference between its velocity and the cutoff velocity.

Figure 8A:
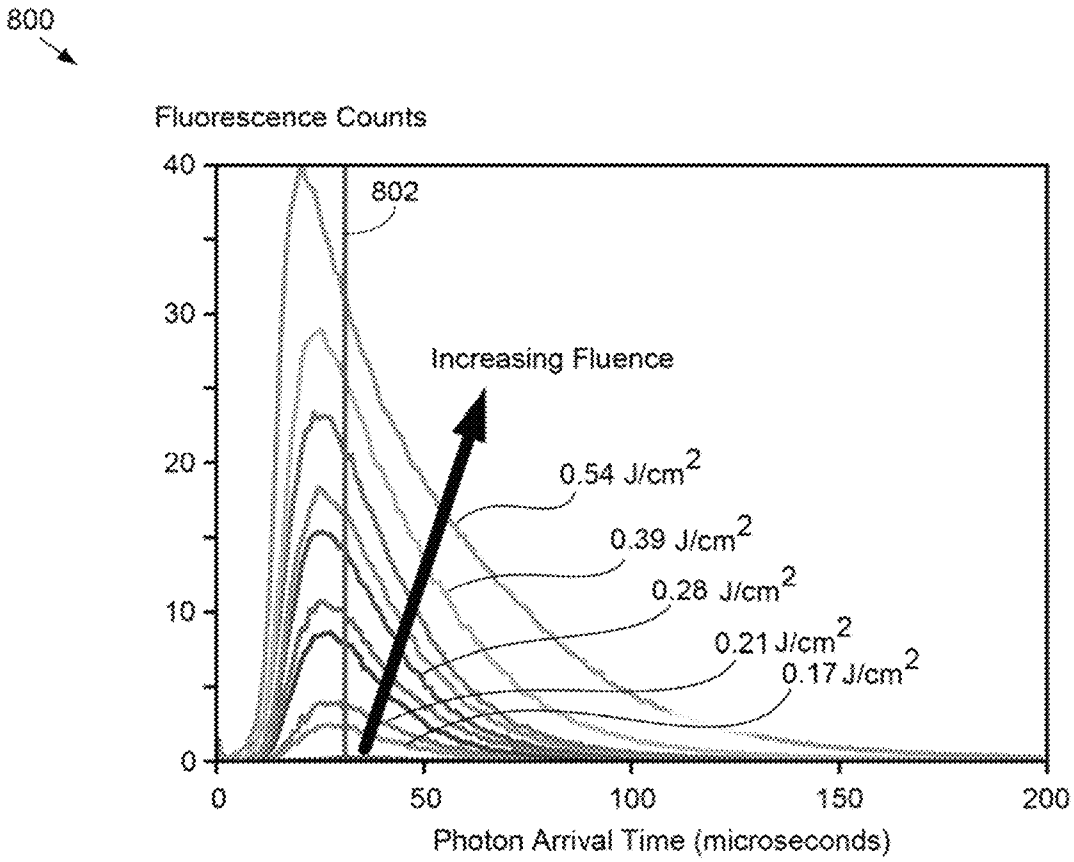
FIGS. 8A-C show a histogram of ablation count versus photon arrival time, stream velocity and temperature, respectively, for an atom flow as a function of ablation-pulse fluences.
Figure 8B:
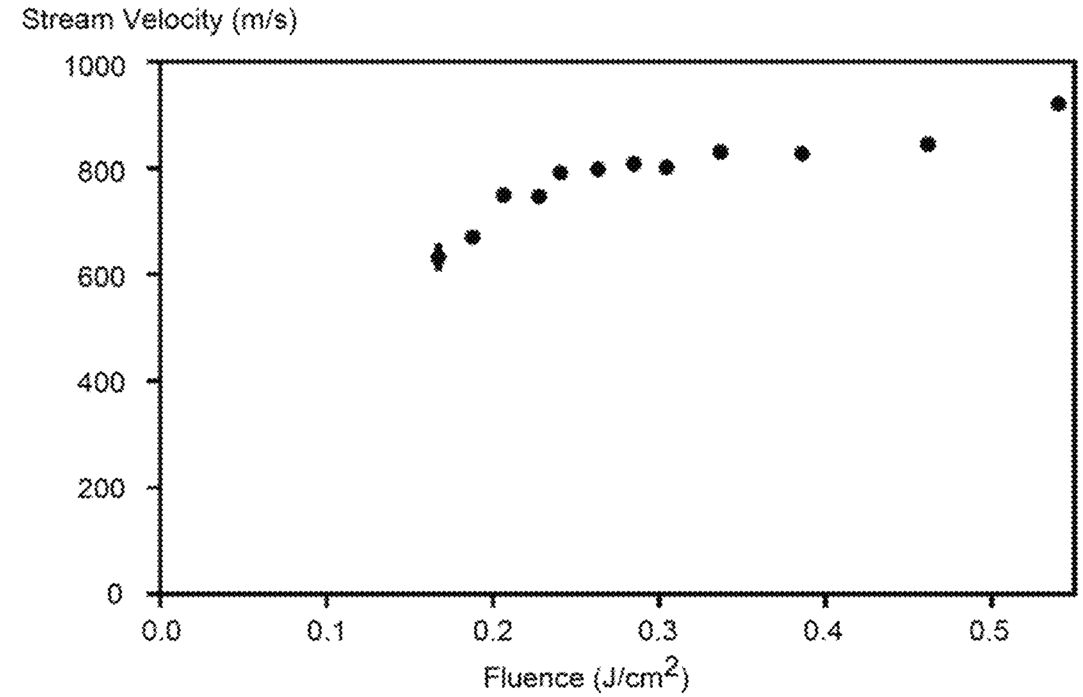
Figure 8C:
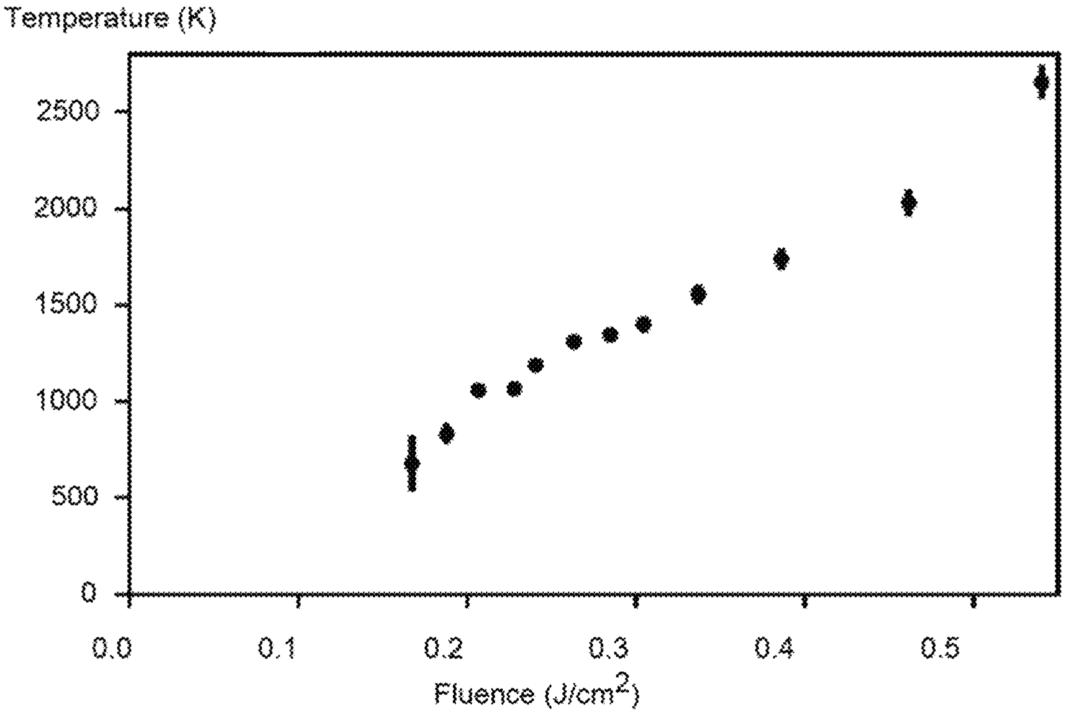

FIGS. 8A-C show a histogram of ablation count versus photon arrival time, stream velocity, and temperature, respectively, for an atom flow as a function of ablation-pulse fluences.

Each curve in plot 800 is a histogram showing the arrival time of photons relative to the ablation pulse (bin width is 1 microsecond), and aggregated for 310 ablation pulses per fluence. Since the distance from ablation oven 210 to trapping region TR1 is fixed as s1, the time-of-flight distribution is converted to a velocity distribution, and the curves are fitted to a one-dimensional Maxwell-Boltzmann (thermal) distribution, which is given by:

$$f(v) = \frac{1}{\sqrt{\pi}\bar{v}} e^{-\frac{(v-v_s)^2}{\bar{v}^2}},$$

where $\bar{v}=\sqrt{2k_bT/m}$ is the temperature-dependent standard deviation of the velocity distribution, $k_b$ is the Boltzmann constant, m is the mass of the atom, T is the effective temperature of the plume and $v_s$ is the stream velocity of atom flow 216.

Plot 800 indicates cutoff time 802, which corresponds to the cutoff velocity.

It can be seen from plots 804 and 806 that the temperature corresponding to the velocity distribution of atom flow 216 is approximately linearly dependent on ablation-pulse fluence. Furthermore, plot 800 shows that ablation pulses having higher fluence liberate a larger population of atoms but the stream velocity (the peak of the velocity distribution) is substantially the same, regardless of fluence. As a result of the broader velocity distribution, and because the overall population of atoms is larger at higher fluence, a higher fluence generates a larger population of atoms having velocities that enable them to be trapped in ion trap 202. The probability that an ablation pulse will result in at least one trapped ion, therefore, increases with the fluence of ablation pulse LP1.

In the depicted example, s1 is equal to 1.1 cm and cutoff time 802 is approximately 37 microseconds; therefore, the cutoff velocity is approximately 30,000 cm per second. It should be noted that the cutoff velocity is affected by the depth of the trap and the mass of the ion, and an adequate fluence for the ablation laser will lead to a range of atom velocities that can be trapped depending on the atomic species of interest, without departing from the scope of the present disclosure.

At sub-operation 506, a desired energy per ablation pulse is determined.

In general, the energy of the ablation pulses is imparted into source material 214 (i.e., absorbed) during the ablation process. This absorbed energy represents a heat load that can give rise to a temperature increase in system 200, which can be problematic for cryogenic operation of the system. In some applications, therefore, a low heat load at ablation oven 210 is preferable. Typically, this dictates that the fluence (energy per unit area) of ablation pulse LP1 is kept as low as possible. It should be noted that, in contrast to prior-art ablation systems, photo-ablation system 204 realizes a relatively lower heat load simply by limiting the fluence of ablation pulse LP1 below Ft, thereby avoiding the high heat generated by a plasma discharge. Furthermore, in embodiments in which ablation oven 210 is located in a different region of system 200 (such as below substrate 304), deleterious effects of the heat load of the ablation oven are further mitigated.

At sub-operation 507, ablation signal 218 is generated such that ablation pulse LP1 has a fluence that is greater than or equal to Fmin and less than Fmax (i.e., Fmin≤F<Ft), where the fluence is controlled within this range based on at least one of the desired ablation rate, maximum velocity, and desired heat load at source material 214. In the depicted example, the maximum pulse energy provided by ablation laser 212 is approximately 0.3 mJ, which corresponds to a peak fluence of 0.6 J/cm$^2$. In some embodiments, the fluence of ablation pulse is other than 0.6 J/cm$^2$ and/or controlled based on a subset of the desired ablation rate, desired velocity, and desired heat load.

Returning now to method 100, at operation 104, photo-ionization (PI) system 206 selectively ionizes neutral atoms of one desired isotope in atom flow 216. As noted above, selective ionization is enabled by the fact that atom flow 216 contains primarily, if not exclusively, neutral atoms and because source material 214 is selected as a material characterized by a plurality of isotopes that can be liberated. As a result, photo-ionization energy is applied to an atom population in which substantially all isotopes are at a common energy level, enabling the ion trap to be presented with an ion population that contains mainly (or only) one isotope of the source material. This enables greater control over the trapping environment, which affords embodiments in accordance with the present disclosure significant advantage over prior-art ion-trap-loading approaches that present a variety of isotopes to an ion trap.

PI system 206 is a two-photon photo-ionization system that comprises PI laser 220-1, PI laser 220-2, and beam splitter 222-1.

PI laser 220-1 is a frequency-stabilized laser that provides output signal 224-1. PI laser 220-1 is configured such that output signal 224-1 is suitable for selectively driving a resonant dipole transition in a particular isotope of source material 214 and exciting the desired isotope into an excited state that is less than the continuum. In the depicted example, output signal 224-1 has up to 120 mW of optical power and is characterized by a wavelength of 399 nm, thereby enabling excitation of only the $^{174}$Yb isotope of source material 214 into the desired excited state. In some embodiments, PI laser 220-1 is frequency stabilized at the adequate wavelength and/or power level selected to drive a different isotope into an excited state.

In another embodiment, the PI laser 220-1 is configured to drive a different transition (e.g., quadrupole, octupole, etc.) to an excited state that is less than the continuum. The excited electron can further be excited to the continuum with another photon, to lead to photoionization.

PI laser 220-2 is a laser that provides output signal 224-2. PI laser 220-2 is configured such that output signal 224-2 is suitable for driving the desired isotope from its excited state to the continuum, thereby ionizing the desired isotope. In the depicted example, output signal 224-2 is characterized by a wavelength of 391 nm. It should be noted that the wavelength of output signal 224-2 does not need to be the optimal wavelength for exciting the desired isotope into the continuum as long as it is sufficient for the task. As a result, in some embodiments, the frequency of PI laser 220-2 does not require frequency stabilization. For example, in the depicted example, the optimal wavelength for exciting the $^{174}$Yb isotope from its excited state into the continuum is 394 nm; however, 391 nm can be more easily combined with the 399 nm wavelength of output signal 224-1 using a conventional dichroic beam splitter.

Beam splitter 222-1 is a conventional dichroic beam splitter that is configured to combine output signals 224-1 and 224-2 into composite PI signal 226. Preferably, PI signal 226 has a beam width that enables several photon-absorption-emission cycles as an atom travels through the beam.

Beam splitter 222-1 and PI laser 220-1 and 220-2 are preferably arranged such that composite PI signal 226 is orthogonal to the average velocity vector of the atoms in atom flow 216. This orthogonality mitigates the effects of Doppler broadening that can give rise to an overlap of different isotopes' lines. Furthermore, it enables PI system 206 to address the entirety, or nearly the entirety, of the atom flow 216 with the proper velocity class.

At operation 105, at least one atom in atom flow 216 is trapped in trapping region TR1.

At optional operation 106, the excitation state of at least one ion trapped in ion trap 202 is controlled via ion-control system 208. Optional ion-control system 208 includes cooling laser 228, repumping laser 230, and beam splitter 220-2.

Cooling laser 228 provides an output signal that is characterized by a wavelength that enables a cycling transition between the $^2S_{1/2}$ ground state and $^2P_{1/2}$ excited state to Doppler cool a trapped ion.

Repumping laser 230 provides an output signal that is characterized by a wavelength that is suitable to pump the trapped ion back into the ground state of the cycling transition if the trapped ion decays to the long-lived $^2D_{3/2}$ state.

The output signals of cooling laser 228 and repumping laser 230 are combined at conventional dichroic beam splitter 222-2 as form beam 232.

In the depicted example, cooling laser 228 is characterized by a wavelength of 370 nm, while repumping laser 230 is characterized by a wavelength of 935 nm.

By controlling the rate of ablation and generating a large population of ions having velocities that enable them to be trapped, embodiments in accordance with the present disclosure provide a greater probability for successfully trapping ions than in the prior art. Furthermore, this improved performance is achieved without significantly increasing the temperature of the ion-trapping system, thereby enabling cryogenic operation. Photo-ablation systems and methods in accordance with the present disclosure offer significant advantage over prior-art photo-ablation systems and methods, therefore, including:

i. preferential liberation of neutral atoms from source material 214; or
ii. mitigation of the generation of multi-atom particles (i.e., agglomerated atoms) or other residues; or
iii. an ability to control the total number of atoms with velocities slower than the cutoff velocity liberated from source material 214 to increase the probability of trapping an ion in the trapping region TR1; or
iv. low energy imparted on the ablation oven 210, thereby enabling operation at cryogenic temperatures; or
v. improved trapping probability; or
vi. any combination of i, ii, iii, iv, and v.

Figure 9:
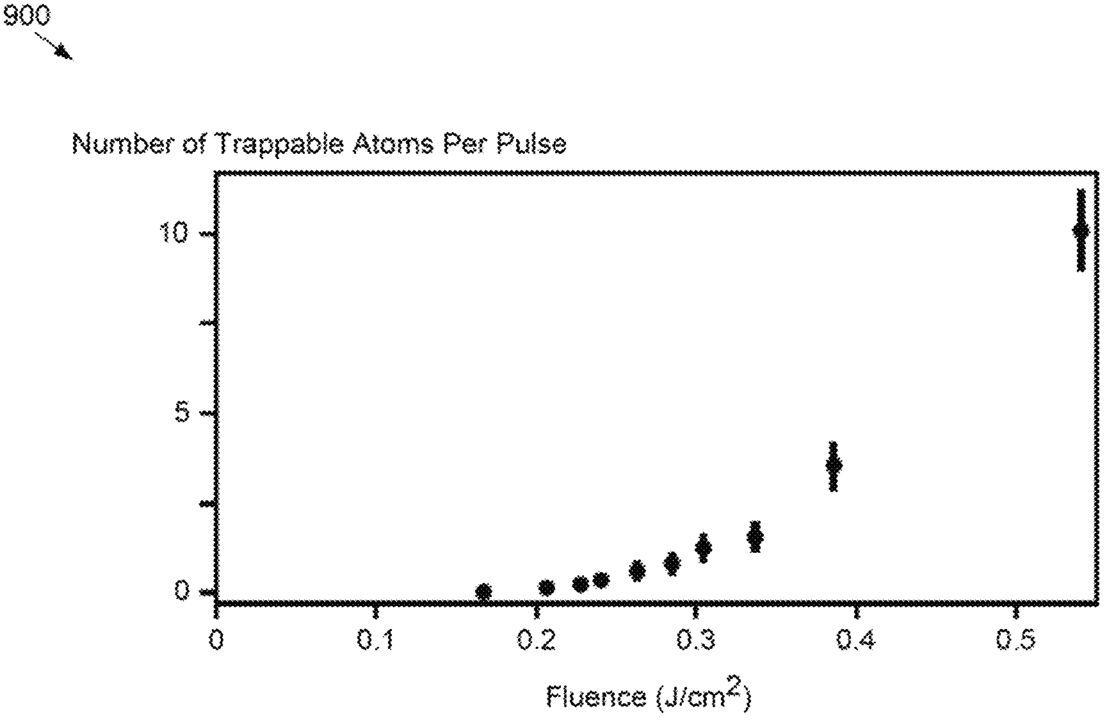
FIG. 9 depicts a plot of estimated trappable ions per ablation pulse as a function of fluence.

FIG. 9 depicts a plot of estimated trappable ions per ablation pulse as a function of fluence. Plot 900 shows estimates for trappable ions based on an overlap between the trapping volume of ion trap 202, the flux of atom flow 216, the depth of trapping region TR1, and the velocity of the liberated atoms.

It can be seen from plot 900 that, for the depicted example, approximately 4 to 10 trappable atoms are generated per ablation pulse as long as its fluence is within the range of approximately 0.37 $J/cm^2$ to approximately 0.55 $J/cm^2$. This corresponds to a trapping probability of approximately unity per pulse. It should be noted that the estimates shown in plot 900 are based on a photo-ionization beam having a beam width that enables several photon-absorption-emission cycles during the time an atom is travelling through the beam.

Figure 10:
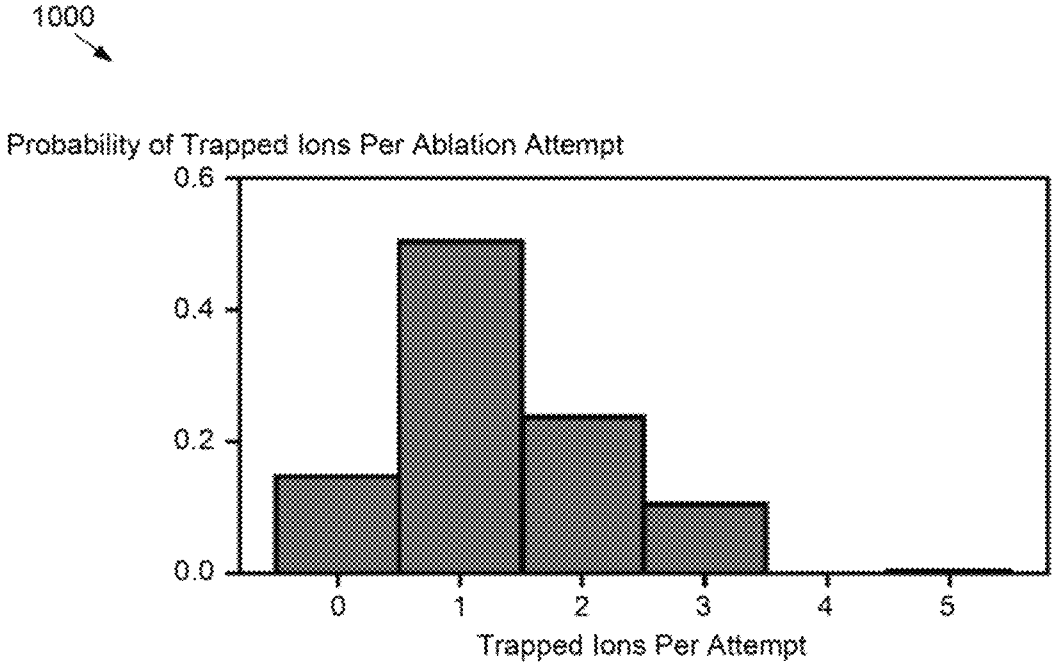
FIG. 10 shows a histogram of the probability of the number of trapped ions per ablation attempt.

FIG. 10 shows a histogram of the probability of the number of trapped ions per ablation attempt. The data shown in plot 1000 was obtained by generating a series of 201 ablation pulses using a fluence of approximately 0.5 $J/cm^2$, probing the presence of a trapped ion by monitoring ion fluorescence (at 370 nm), and recording the number of ions generated by each ablation pulse.

Plot 1000 shows that a single ablation pulse yields at least one trapped ion 85% of the time, with probability distribution being approximately geometric. The average number of trapping attempts to successfully load one ion was 1.17 pulses which, for an ablation repetition rate of 20 Hz, leads to a mean time-to-trap of 9 milliseconds, which represents an improvement of more than three orders of magnitude over prior-art thermal sources. It can be seen from plot 1000 that the trapping probability for a single ion on the first attempt is greater than 50%.

It is to be understood that the disclosure teaches just some examples of embodiments in accordance with the present disclosure and that many alternative embodiments can easily be devised by those skilled in the art after reading this disclosure and that the scope of the present invention is to be determined by the following claims.

What is claimed is:

1. An ion-trap system comprising:
an ion trap, wherein the ion trap is a microfabricated surface-electrode ion trap comprising a substrate and a plurality of electrodes disposed on the substrate, wherein the plurality of electrodes defines a trapping region having a trapping-region depth;
a photo-ablation system comprising:
(i) an ablation oven for holding a source material comprising atoms characterized by a first mass and being characterized by a plurality of isotopes that includes a first isotope having a first characteristic resonant frequency, wherein the ablation oven comprises a housing that defines a chamber, and wherein the housing includes at least one sidewall and is configured to hold the source material within the chamber and inhibit propagation of residue generated at the ablation oven to the ion trap; and
(ii) an ablation laser that is configured to provide an ablation pulse to the source material to generate an atom flow that includes a plurality of neutral atoms;
wherein the housing is electrically grounded to enable ions in the atom flow to be attracted to the at least one sidewall; and
a photo-ionization (PI) system configured to (1) enable excitation of a first neutral atom of the plurality thereof to a first excited state with a first photon and (2) enable excitation of the first neutral atom from the first excited state to the continuum with a second photon;
wherein the ablation laser is configured such that the ablation pulse has a fluence that gives rise to greater than a 50% probability of trapping the first ion in the ion trap.

2. The system of claim 1 wherein the PI system includes:
a first photo-ionization (PI) laser configured to provide the first photon, the first PI laser having a frequency that is equal to the first characteristic frequency; and
a second PI laser configured to provide the second photon.

3. The system of claim 1 wherein the PI system includes a PI laser that is configured to provide each of the first and second photons.

4. The system of claim 1 wherein the ablation oven is configured such that it comprises an aperture that enables optical and fluidic access to the chamber.

5. The system of claim 4 wherein the housing is configured to restrict the flow of agglomerated neutral atoms toward the trapping region.

6. The system of claim 1 wherein the source material is characterized by a second fluence at which plasma generation at the source material is enabled, and wherein the first fluence is less than the second fluence.

7. A method for trapping an ion, the method comprising:
locating a source material within a chamber of a housing of an ablation oven, the housing being electrically grounded;
photo-ablating an atom flow from the source material with an ablation pulse having a fluence that is controlled, wherein the fluence is sufficient to generate the atom flow without inducing a plasma discharge;
exciting a first neutral atom of the atom flow to a first excited state with a first photon;
ionizing the first neutral atom to create the ion by exciting the first neutral atom from the first excited state to the continuum with a second photon; and trapping the ion in an ion trap that is a microfabricated surface-electrode ion trap comprising a substrate and a plurality of electrodes disposed on the substrate, wherein the plurality of electrodes defines a trapping region;

wherein the fluence is controlled to yield a greater than 50% probability of trapping the ion in the ion trap.

8. The method of claim 7 further comprising:

providing the source material such that it is characterized by a plurality of isotopes that includes a first isotope having a resonant dipole transition characterized by a first resonant frequency;

providing the first photon as part of a first laser signal that frequency stabilized at the first resonant frequency; and providing the second photon as part of a second laser signal.

9. The method of claim 7 further comprising:

providing the first photon as part of a first laser signal that is suitable for driving a first transition that excites the neutral atom to the first excited state, wherein the first excited state is equal to or greater than 50% and less than 100% of the energy required to excite the first neutral atom to the continuum; and providing the second photon as part of the first laser signal.

10. The method of claim 7 further comprising controlling the fluence of the ablation pulse to control at least one of: the velocity of the first neutral atom, the rate of ablation of the source material, and the heat load at the source material.

11. The method of claim 7 further comprising providing a first photo-ionization (PI) laser signal that includes the first photon, and providing the first PI laser signal such that the first neutral atom undergoes a plurality of photon absorption-emission cycles during exposure of the first neutral atom to the first PI laser signal.

12. The method of claim 11 further comprising providing a second PI laser signal that includes the second photon, and providing the second PI laser signal such that the first neutral atom undergoes a plurality of photon absorption-emission cycles during exposure of the first neutral atom to the second PI laser signal.

13. The method of claim 7 further comprising locating the source material in an ablation oven that includes a housing that is configured to restrict the flow of agglomerated neutral atoms toward the trapping region.

14. The method of claim 13 further comprising locating the ablation oven such that the ablation oven and the trapping region are on the same side of the ion trap.

15. A method for trapping an ion, the method comprising:

locating a source material within a chamber of a housing of an ablation oven, the housing having at least one sidewall;

electrically grounding the at least one sidewall;

generating an atom flow including at least one neutral atom from a source material with an ablation pulse having a fluence that it is sufficient to photo-ablate the at least one neutral atom from the source material without inducing a plasma discharge, wherein the at least one neutral atom is characterized by a first mass;

controlling the fluence to control the velocity of the at least one neutral atom within a desired range that is less than or equal to a cutoff velocity that is based on a trapping-region depth and the first mass;

exciting a first neutral atom of the atom flow to a first excited state with a first photon;

ionizing the first neutral atom to create the ion by exciting the first neutral atom from the first excited state to the continuum with a second photon; and trapping the ion in an ion trap that is a microfabricated surface-electrode ion trap comprising a substrate and a plurality of electrodes disposed on the substrate, wherein the plurality of electrodes defines a trapping region characterized by the trapping-region depth.

16. The method of claim 15 wherein the housing is configured to restrict the flow of agglomerated neutral atoms toward the trapping region.

17. The method of claim 16 further comprising locating the ablation oven such that the ablation oven and the trapping region are on the same side of the ion trap.

18. The method of claim 15 further comprising:

providing the source material such that it is characterized by a plurality of isotopes that includes a first isotope having a resonant dipole transition characterized by a first resonant frequency;

providing the first photon as part of a first laser signal that frequency stabilized at the first resonant frequency; and providing the second photon as part of a second laser signal.

19. The method of claim 15 further comprising providing a first photo-ionization (PI) laser signal that includes the first photon, and providing the first PI laser signal such that the first neutral atom undergoes a plurality of photon absorption-emission cycles during exposure of the first neutral atom to the first PI laser signal.

20. The method of claim 19 further comprising providing a second PI laser signal that includes the second photon, and providing the second PI laser signal such that the first neutral atom undergoes a plurality of photon absorption-emission cycles during exposure of the first neutral atom to the second PI laser signal.

* * * * *